United States Patent Office 2,914,552
Patented Nov. 24, 1959

2,914,552

2-DILOWERALKYLAMINO-ALKOXY-3-METHYL-BENZOIC ACID ESTERS

Rudolf Hiltmann, Fritz Mietzsch, and Kürt Kaemmerer, Wuppertal-Elberfeld, Germany, assignors to Schenley Industries, Inc., New York, N.Y., a corporation of Delaware No Drawing. Application January 13, 1958
Serial No. 708,361

Claims priority, application Germany February 21, 1957

7 Claims. (Cl. 260—471)

This invention relates to and has as its object the production of novel amino alkyl aryl ethers which have been found to constitute excellent anesthetics of long lasting action.

The novel amino alkyl aryl ethers, in accordance with the invention, have the general formula:

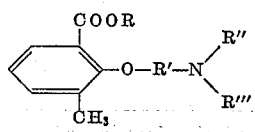

in which R is a methyl or ethyl radical, R' a lower divalent alkyl radical, having, for example, up to 3 carbon atoms, R'' a lower alkyl radical and preferably an ethyl or methyl radical, and R''' a lower alkyl radical or hydrogen, and preferably an ethyl or methyl radical. R'' and R''' are preferably the same radical, and more preferably both methyl or ethyl radicals.

R'' and R''' may, together with the nitrogen, form a heterocyclic ring such as a pyrrolidine, piperidine, morpholine or piperazine ring. When R'' and R''' form a ring with the nitrogen atom, the radical represented by

preferably represent the piperidino or morpholino radical.

The novel compounds, in accordance with the invention, may be prepared by reacting an alkyl o-cresotate with a reactive ester of a corresponding tertiary amino alcohol, preferably in the presence of an acid acceptor such as an alkali hydroxide, alkali carbonate, alkali metal alcoholate, or the like, and in the additional presence of a solvent. Particularly suitable reactive esters of the amino alcohols are the hydrohalic esters and the alkyl- or arylsulfonic esters. Examples of suitable amino alcohols which form the alcohol components of the started esters include β-dimethyl- and β-diethylaminoethanol, β- and γ-dimethylaminopropanol, β-N-piperidino- and β-N-pyrrolidinoethanol, N-morpholinoethanol or N-(N'-methylpiperazino)-ethanol, and the corresponding propanols. If the end products are to contain a secondary amino group, amino alcohols should be used which contain a tertiary amino group which may be subsequently converted into a secondary one. For this purpose N-benzyl-N-alkyl-amino alcohols are preferred. The benzyl group may be removed and substituted by a hydrogen atom using conventional methods after the N-benzyl-N-alkyl-amino ethers of the o-cresotate has been formed. The removal and hydrogen substitution may be effected, for example, by catalytic hydrogenation in the presence of a noble metal catalyst.

The monoalkylamino or dialkylamino alkyl radical can also be synthesized step by step. For this purpose, an alkyl o-cresotate is reacted with reactive esters of alcohols bearing a substituent which is convertible into a monoalkylamino or dialkylamino group, as for example, a hydroxyl group, a halogen atom, or a nitrile or carboxamide group, and this substituent is subsequently converted into the dialkyl or amino group. Thus for example, the alkyl o-cresotate is first of all reacted with a haloalcohol, a dihaloalcohol, or an alkyl- or arylsulfonic ester of a haloalcohol, and the hydroxyl group or the halogen atom is then exchanged by the mono- or dialkylamino group in the conventional manner. Alternatively, a phthalimidoalkyl halide, a halocarboxamide, or a nitrile of a halocarboxylic acid, for example, may be reacted with an alkyl o-cresotate, the phthalimido, carboxamide or nitrile group in the reaction product formed converted into an amino group, in the conventional manner, and the latter alkylated according to familiar methods. If it is desired to prepare aminopropyl ethers of the alkyl o-cresotate, the latter may also be reacted with the corresponding acrylic acid derivatives in the presence of suitable catalysts, to form analogous intermediate products. Finally, it is possible to start with dialkylaminoalkyl carbonates of the alkyl o-cresotate and then to split off carbon dioxide from these esters by heating, possibly in the presence of catalysts.

The novel aminoalkyl aryl ethers, in accordance with the invention, are colorless or yellowish substances which are distillable in vacuo and form readily soluble salts with mineral acids or organic acids. The novel ethers as such or in the form of their salts constitute highly effective local anesthetics which are distinguished by their long lasting action, making the same excellently suited for use in veterinary medicine and as surface anesthetics for the dental practice. For this purpose, the compounds may be administered as such, or in the form of their salts, such as their water soluble salts, with mineral or organic acids, and particularly in the form of their hydrochloric acid salts by injection, in the conventional manner. The compounds when used as local anesthetics show very low toxicity and a very rapid onset of action.

As contrasted to the 2-methyl-6-carbalkoxy-N-alkyl-aminoacylanilides of our copending application Serial No. 610,728, filed September 19, 1956, the novel ethers, in accordance with the invention, show a much longer duration of action, and, in some cases, even a more rapid onset of action, so that the same are more highly suited for veterinary practice.

As are contrasted to the known corresponding amino alkyl aryl ethers which do not contain the methyl group in the ortho position with respect to the ether oxygen on the aromatic nucleus, the compounds, in accordance with the invention, have a much longer duration of action, and, at least as rapid an onset of action.

The following examples are given by way of illustration and not limitation:

*Example 1*

41.5 g. of methyl o-cresotate is added to a solution of 5.8 g. of sodium in 200 ml. of methanol, and the methanol is then distilled off to the greatest extent possible, using vacuum in the end. After drying, the finely pulverized flask residue is suspended in 200 ml. of dry toluene. 30 g. of dimethylaminoethyl chloride diluted with an equal volume of toluene is slowly passed into the boiling mixture, followed by boiling under a reflux condenser for 24 hours. When cool, the toluene solution is washed first with water, causing the precipitate to dissolve, and then twice with 5% caustic soda solution to remove any unreacted starting material, and finally again with water. Now the toluene solution is extracted with an approximately twice-normal hydrochloric acid, the base is precipitated from the HCl solution by means of potassium carbonate solution, and after removal of the solvent the residue is distilled in vacuo, yielding 30 g. of the methyl ester of 2-(β-dimethyl-aminoethoxy)-3-methylbenzoic acid, which is a colorless oil of B.P.₅ 134–136°. The readily water-soluble hydrochloride melts at 127°.

The following compounds can be prepared in analogous fashion:

Methyl 2-(γ-dimethylaminopropoxy)-3-methylbenzoate, B.P.₅ 149–152°, hydrochloride M.P. 90–91°.

Methyl 2-(β-diethylaminoethoxy) - 3 - methylbenzoate, B.P.₄ 147–149°, hydrochloride M.P. 122°.

*Example 2*

41.5 g. of methyl o-cresotate is added to a sodium methylate solution prepared from 5.8 g. of sodium and 200 ml. of methanol. Into this mixture 40 g. of N-morpholinoethyl chloride is instilled at boiling temperature under a reflux condenser. After another 8 hours of boiling the product is allowed to cool, insoluble components are filtered off by suction, and the filtrate is evaporated under vacuum. The residue is taken up with benzene and worked up further as described in Example 1. Obtained is 25.1 g. of methyl 2-(β-N-morpholinoethoxy)-3-methylbenzoate, which forms a colorless oil boiling under 5 mm. pressure at 190–192°. The hydrochloride melts at 180–181°.

*Example 3*

36 g. of ethyl o-cresotate is added to a sodium ethylate solution prepared from 4.6 g. of sodium and 150 ml. of alcohol. After further addition of 2 g. of sodium iodide 30 g. of β-dimethylaminopropyl chloride is instilled into the boiling mixture, and boiling is continued for 8 hours. After cooling, the product is suction-filtered, the solvent is expelled under vacuum, and the residue is dissolved in benzene. The benzene solution so obtained is processed further as described in Example 1. Vacuum distillation then yields 26.5 g. of ethyl 2-(β-dimethylaminopropoxy)-3-methylbenzoate of B.P.₄ 145–149°, representing a yellowish oil. The hydrochloride melts at 143–144°.

The analogous procedure may be followed to prepare these compounds:

Ethyl 2-(β-N-piperidinoethoxy) - 3 - methylbenzoate, B.P.₆ 196–198°; hydrochloride M.P. 111–112°.

Ethyl 2-(γ-diethylaminopropoxy) - 3 - methylbenzoate, B.P.₃ 161–162°.

Ethyl 2-(β-N-morpholinoethoxy) - 3 - methylbenzoate, B.P.₅ 188–192°; hydrochloride M.P. 140.5–141°.

Ethyl 2 - (β-dimethylaminoethoxy)-3-methylbenzoate, B.P.₅ 151°; phosphate M.P. 93–95°.

*Example 4*

In order to illustrate the anesthetic effect of compounds, in accordance with the invention, and compare the same with the known amino alkyl aryl ethers which do not contain the methyl radical in the ortho position on the aromatic nucleus and the anesthetic effect of methyl 2-(γ-dimethylamino-propoxy)-3-methylbenzoate, methyl 4 - (γ - dimethylamino - β-hydroxypropoxy)-benzoate, and methyl 2-(β-dimethylamino-ethoxy)-benzoate were tested on albino rats. The compounds were injected around the caudal root, in accordance with the Luckener method as modified by Wirth (Arch. exp. Path. Pharm. 216, p. 81, 1952), and the sensitivity to pain was determined with the aid of a defined electric stimuli. The results of the test indicating the number of animals treated, the percent of concentration of the compounds, the onset of the anesthetic action in minutes and the duration of the anesthetic action in minutes is shown in the following table:

| Formula: | no. of animals | conc., percent | onset of action in min. | duration of action in min. |
|---|---|---|---|---|
| COOCH₃ / ⟨benzene⟩—O(CH₂)₃—N(CH₃)₂ / CH₃ | 10 | 0.5 | 1½ | 163.2 |
| H₃COOC—⟨benzene⟩—O—CH₂—CH—CH₂—N(CH₃)₂ / OH | 10 | 0.5 | 3 | 43 |
| COOCH₃ / ⟨benzene⟩—O—(CH₂)₂—N(CH₃)₂ | 10 | 0.5 | 1 | 39 |

As may be noted, the duration of action of the compounds, in accordance with the invention, are many times longer than that of the known compounds, while the onset of action may be favorably compared.

We claim:

1. A member selected from the group consisting of compounds having the general formula:

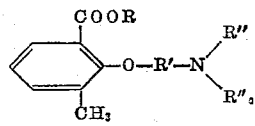

in which R is a member selected from the group consisting of methyl and ethyl radicals, R′ is a lower divalent alkyl radical, R″ is a lower alkyl radical, R‴ is a member selected from the group consisting of hydrogen and lower alkyl radicals, and acid addition salts of said compound.

2. Methyl 2 - (β - dimethylaminoethoxy)-3-methylbenzoate.

3. Methyl 2 - (γ - diethylaminopropoxy) - 3 - methylbenzoate.

4. Methyl 2 - (β - diethylaminoethoxy) - 3-methylbenzoate.

5. Ethyl 2 - (β - dimethylaminopropoxy)-3-methylbenzoate.

6. Ethyl 2 - (γ - diethylaminopropoxy) - 3-methylbenzoate, B.P.₃ 161–162°.

7. Ethyl 2 - (β - dimethylaminoethoxy) - 3-methylbenzoate, B.P.₅ 151°; phosphate M.P. 93–95°.

References Cited in the file of this patent

UNITED STATES PATENTS 2,810,719    Moore et al. _____ Nov. 22, 1957

FOREIGN PATENTS 137,144    Switzerland _____ Dec. 15, 1929

OTHER REFERENCES

Moore et al.: J.A.C.S., vol. 79, pp. 5633–6 (1956).
Sakera et al.: Experientia, vol. 11, pp. 275–276 (1955).